United States Patent
Yoo et al.

(10) Patent No.: US 8,411,244 B2
(45) Date of Patent: Apr. 2, 2013

(54) LIQUID CRYSTAL DISPLAY DEVICE AND FABRICATING METHOD THEREOF WITH A SIMPLIFIED MASK PROCESS

(75) Inventors: Soon Sung Yoo, Gunpo-si (KR); Oh Nam Kwon, Yongin-si (KR); Youn Gyoung Chang, Anyang-si (KR); Heung Lyul Cho, Suwon-si (KR); Seung Hee Nam, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 469 days.

(21) Appl. No.: 11/471,648

(22) Filed: Jun. 21, 2006

(65) Prior Publication Data

US 2007/0002249 A1   Jan. 4, 2007

(30) Foreign Application Priority Data

Jun. 30, 2005   (KR) ................ 10-2005-0057950

(51) Int. Cl.
*G02F 1/1343*   (2006.01)
*G02F 1/136*    (2006.01)
*G02F 1/1333*   (2006.01)
*G02F 1/13*     (2006.01)
*H01L 21/00*    (2006.01)

(52) U.S. Cl. ............ 349/187; 349/39; 349/46; 349/138; 349/141; 349/147; 438/30

(58) Field of Classification Search .......... 349/141, 349/147, 38, 39, 43, 46, 138, 139, 145, 146, 349/187; 438/30
See application file for complete search history.

(56) References Cited

U.S. PATENT DOCUMENTS

| 5,162,933 A | 11/1992 | Kakuda et al. |
| 5,317,433 A | 5/1994  | Miyawaki et al. |

(Continued)

FOREIGN PATENT DOCUMENTS

| CN | 1550857   | 12/2004 |
| JP | 08-172202 | 7/1996  |

(Continued)

*Primary Examiner* — Bumsuk Won
*Assistant Examiner* — Paisley L Arendt
(74) *Attorney, Agent, or Firm* — McKenna Long & Aldridge, LLP

(57) ABSTRACT

A liquid crystal display device and a fabricating method thereof for simplifying a process are disclosed. In the method of fabricating the liquid crystal display device, a first conductive pattern group including a gate line and a gate electrode, a common line and a common electrode, a pixel electrode and a pad in a multiple conductive layer having a stepwise shape including a transparent conductive layer is formed on a substrate by a first mask process. An insulating film and a semiconductor layer including a plurality of contact holes are formed on the first mask pattern group by a second mask process. A second pattern group including a data line, a source electrode and a drain electrode is formed on the semiconductor layer and the semiconductor layer is patterned, and an active layer is exposed between the source electrode and the drain electrode by a third mask process.

22 Claims, 16 Drawing Sheets

U.S. PATENT DOCUMENTS

| | | | |
|---|---|---|---|
| 5,339,181 A | 8/1994 | Kim et al. | |
| 5,462,887 A | 10/1995 | Gluck | |
| 5,668,379 A | 9/1997 | Ono et al. | |
| 5,731,856 A | 3/1998 | Kim et al. | |
| 5,771,083 A | 6/1998 | Fujihara et al. | |
| 5,793,460 A | 8/1998 | Yang | |
| 5,838,037 A * | 11/1998 | Masutani et al. | 257/296 |
| 5,847,781 A | 12/1998 | Ono et al. | |
| 6,747,722 B2 * | 6/2004 | Ono et al. | 349/141 |
| 6,897,925 B2 * | 5/2005 | Kim et al. | 349/114 |
| 7,132,688 B2 * | 11/2006 | Yoo et al. | 257/59 |
| 7,336,336 B2 * | 2/2008 | Yoo et al. | 349/187 |
| 2001/0035527 A1 * | 11/2001 | Tanaka et al. | 257/59 |
| 2005/0078259 A1 * | 4/2005 | Ahn et al. | 349/141 |
| 2005/0092990 A1 * | 5/2005 | Yoo et al. | 257/59 |

FOREIGN PATENT DOCUMENTS

| | | |
|---|---|---|
| JP | 09-269508 | 10/1997 |
| JP | 11-024095 | 1/1999 |
| JP | 2001-109014 | 4/2001 |
| JP | 2001-201756 | 7/2001 |
| JP | 2002-139737 | 5/2002 |
| JP | 2005-122185 | 5/2005 |

* cited by examiner

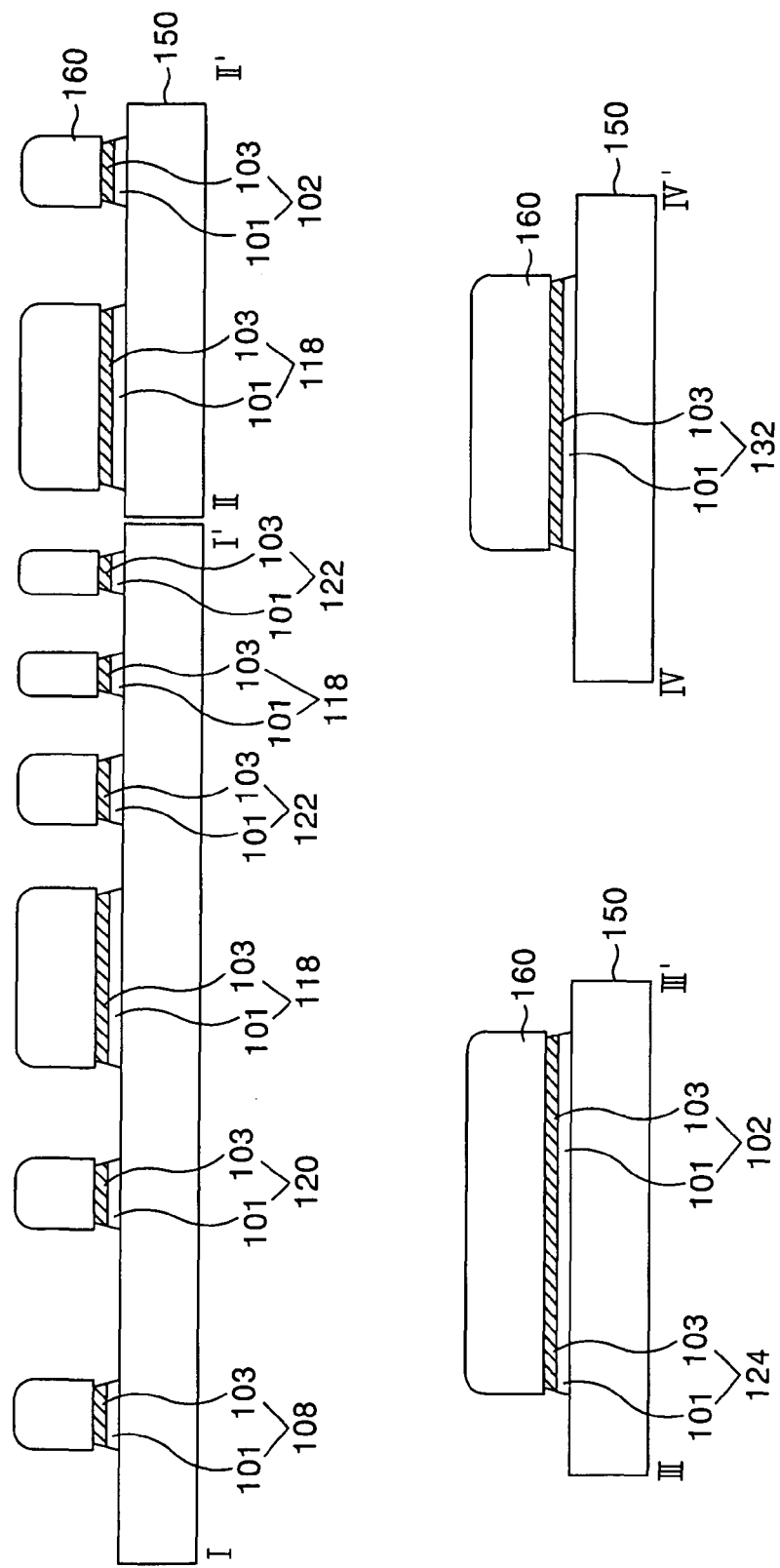

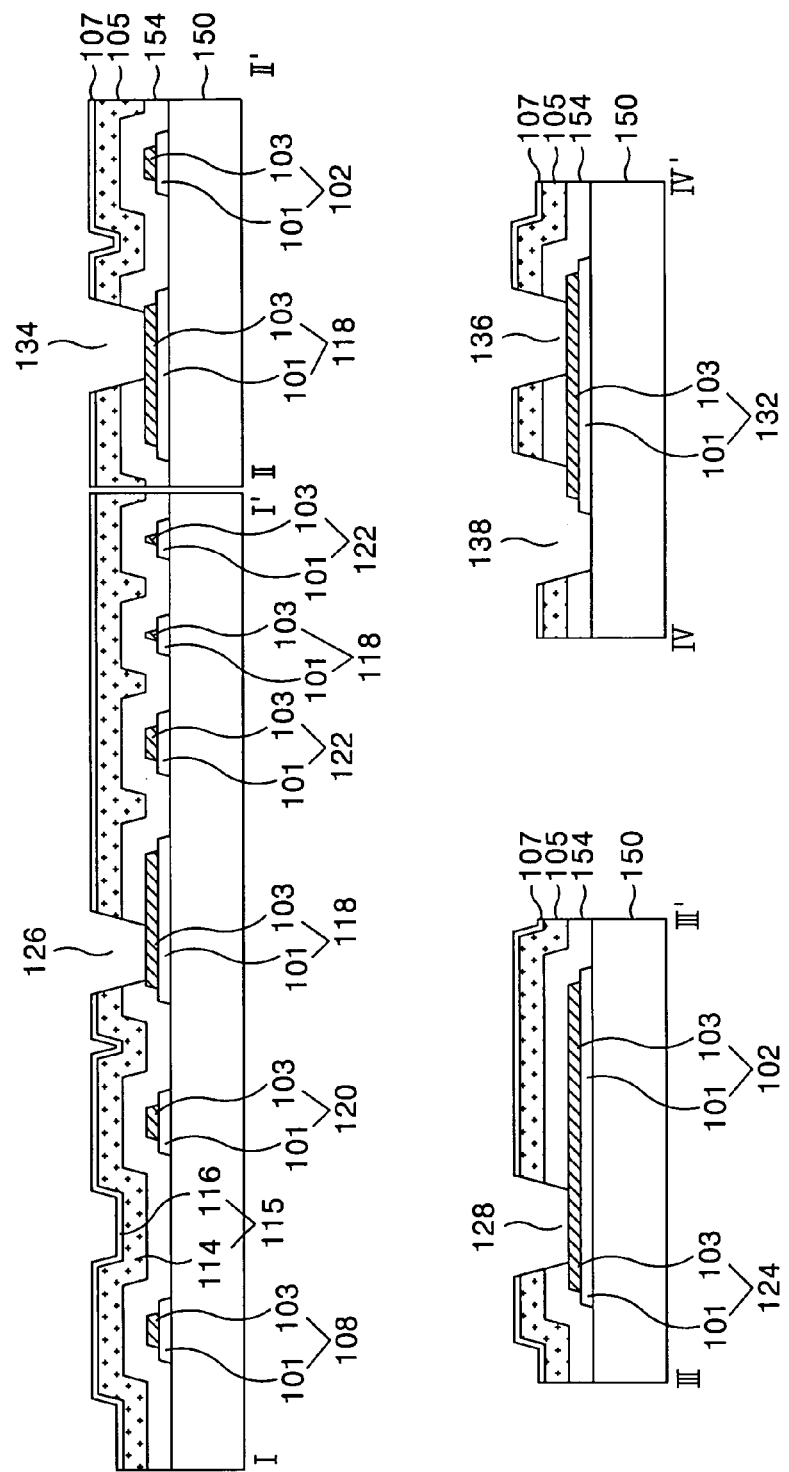

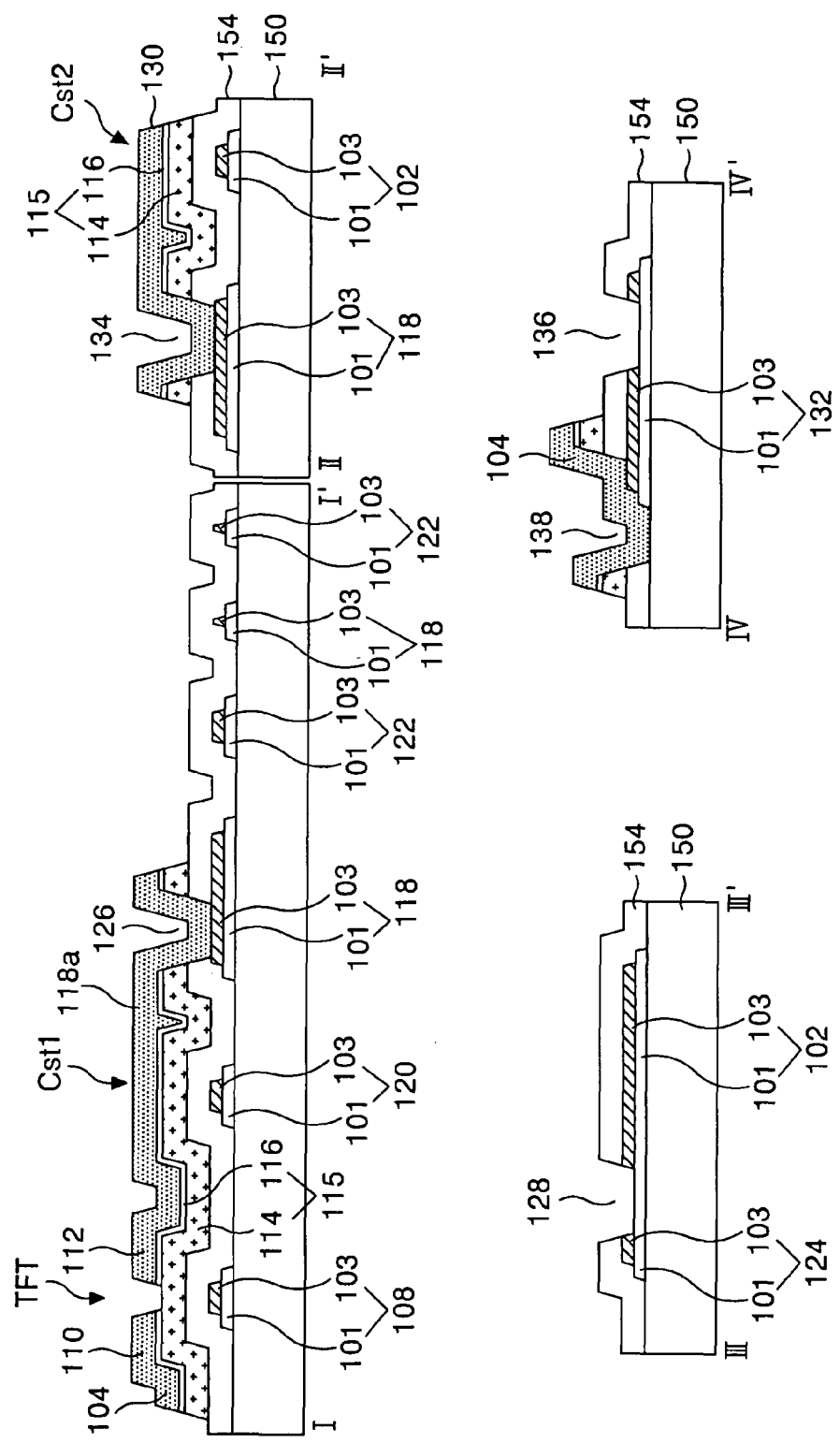

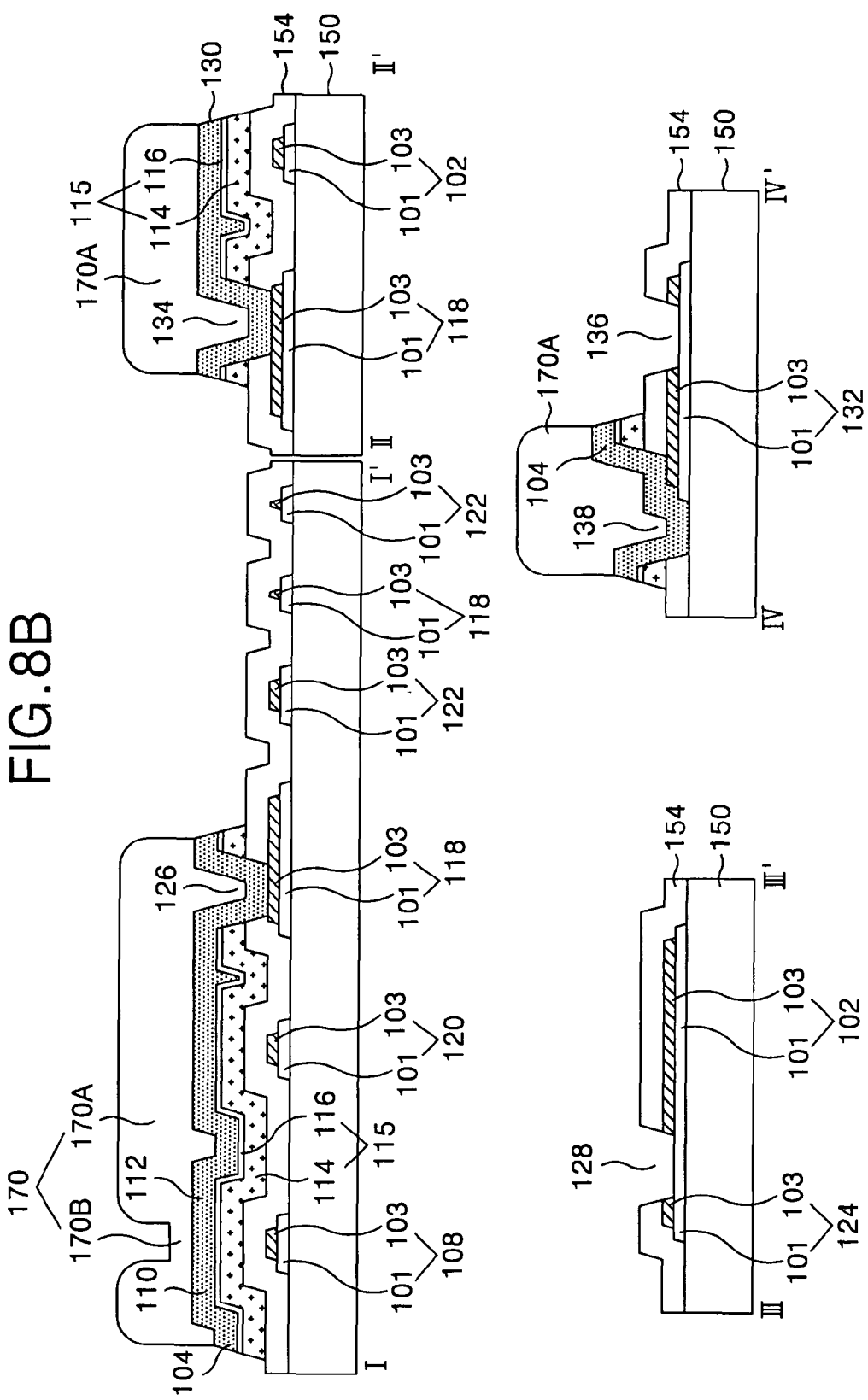

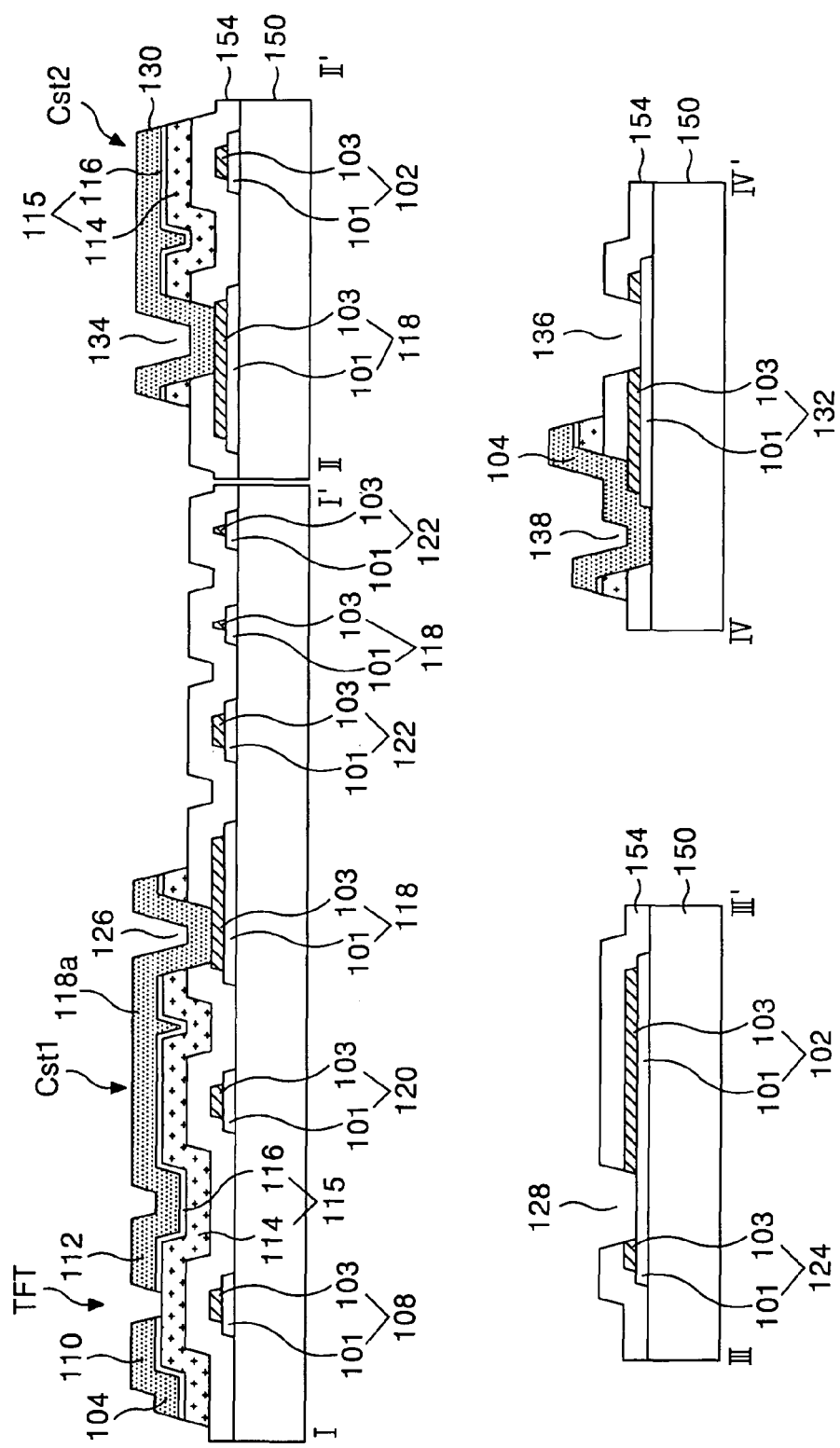

LIQUID CRYSTAL DISPLAY DEVICE AND FABRICATING METHOD THEREOF WITH A SIMPLIFIED MASK PROCESS

This application claims the benefit of Korean Patent Application No. P2005-0057950 filed in Korea on Jun. 30, 2005, which is hereby incorporated by reference for all purposes as if fully set forth herein.

BACKGROUND OF THE INVENTION

1. Field of the Invention

This invention relates to a liquid crystal display device, and more particularly to a liquid crystal display device of horizontal electric field applying type and a fabricating method thereof that are adaptive for simplifying a process.

2. Description of the Related Art

Generally, a liquid crystal display device (LCD) uses an electric field to control light transmittance through a liquid crystal having a dielectric anisotropy to thereby display a picture. To this end, the LCD includes a liquid crystal display panel that has a matrix of liquid crystal cells, and a driving circuit for driving the liquid crystal display panel to display an image.

Referring to FIG. 1, a related art liquid crystal display panel includes a color filter substrate 10 and the thin film transistor substrate 20 that are joined to each other with a liquid crystal 24 therebetween.

The color filter substrate 10 includes a black matrix 4, a color filter 6 and a common electrode 8 that are sequentially provided on an upper glass substrate 2. The black matrix 4 is provided in a matrix on the upper glass substrate 2. The black matrix 4 divides an area of the upper glass substrate 2 into a plurality of cell areas to be provided with the color filter 6 and prevents light interference between adjacent cells and an external light reflection. The color filter 6 is provided at the cell area divided by the black matrix 4 to provide red (R), green (G) and blue (B) cell areas, thereby transmitting red, green and blue lights. The common electrode 8 is formed of a transparent conductive layer entirely formed onto the color filter 6, and supplies a common voltage Vcom that serves as a reference voltage upon driving of the liquid crystal 24. Further, an over coat layer (not shown) for smoothing the color filter 6 may be provided between the color filter 6 and the common electrode 8.

The thin film transistor substrate 20 includes a thin film transistor 18 and a pixel electrode 22 for each cell area defined by crossing between gate lines 14 and a data lines 16 on a lower glass substrate 12. The thin film transistor 18 applies a data signal from the data line 16 to the pixel electrode 22 in response to a gate signal from the gate line 14. The pixel electrode 22 formed of a transparent conductive layer supplies a data signal from the thin film transistor 18 to drive the liquid crystal 24.

The liquid crystal 24 having a dielectric anisotropy is rotated in accordance with an electric field formed by a data signal from a pixel electrode 22 and a common voltage Vcom from the common electrode 8 to control light transmittance, thereby implementing a gray scale level.

Further, the liquid crystal display panel includes an alignment film for initial aligning of the liquid crystal, and a spacer (not shown) for constantly keeping a cell gap between the color filter substrate 10 and the thin film transistor substrate 20.

In such a liquid crystal display panel, the color filter substrate 10 and the thin film transistor substrate 20 are formed by a plurality of mask processes. Herein, one mask process includes a lot of processes such as thin film deposition (coating), cleaning, photolithography, etching, photo-resist stripping and inspection processes, etc.

Particularly, since the thin film transistor substrate includes the semiconductor process and requires the plurality of mask processes, it has a complicated fabricating process that contributes to high manufacturing cost of the liquid crystal display panel. Therefore, research and development toward a reduction in the number of mask process from a five-round mask process that is a standard mask process is continuing.

The liquid crystal displays are largely classified into a vertical electric field applying type and a horizontal electric field applying type depending upon with a direction of the electric field driving the liquid crystal.

The liquid crystal display device of vertical electric field applying type drives a liquid crystal in a twisted nematic (TN) mode with a vertical electric field formed between a pixel electrode and a common electrode arranged in opposition to each other on the upper and lower substrate. The liquid crystal display of vertical electric field applying type has an advantage of a large aperture ratio while having a drawback of a narrow viewing angle about 90°.

The liquid crystal display device of horizontal electric field applying type drives a liquid crystal in an in plane switching (IPS) mode with a horizontal electric field between the pixel electrode and the common electrode arranged in parallel to each other on the lower substrate. The liquid crystal display device of horizontal electric field applying type has an advantage of a wide viewing angle about 160°.

The thin film transistor substrate in the liquid crystal display device of horizontal electric field applying type also requires a plurality of mask processes which has a drawback of a complicated fabricating process. Therefore, in order to reduce the manufacturing cost, it is necessary to reduce the number of mask processes.

SUMMARY OF THE INVENTION

Accordingly, the present invention is directed to a liquid crystal display device and fabricating method thereof that substantially obviated one or more of the problems due to limitations and disadvantages of the related art.

Accordingly, it is an advantage of the present invention to provide a liquid crystal display device of horizontal electric field applying type and a fabricating method thereof that are adaptive for simplifying a process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other advantages of the invention, the liquid crystal display device according to one aspect of the present invention comprises a data line crossing a gate line on a substrate to define a pixel area; an insulating film between the gate line and the data line; a thin film transistor connected to the gate line and the data line; a pixel electrode connected to the thin film transistor in the pixel area; a common electrode provided at the pixel area in parallel to the pixel electrode; a common line connected to the common electrode; a pad connected to at least one of the gate line, the data line and the common line; and a first pattern group including the gate line, the gate electrode of the thin film transistor, the pixel electrode, the common electrode, the common line, and the pad includes a multiple-layer conductive layer having a stepwise shape including a transparent conductive layer.

In the liquid crystal display device, the first pattern group has a multiple-layer structure having a substantially opaque conductive layer on the transparent conductive layer.

In the liquid crystal display device, the transparent conductive layer is formed in such a manner to substantially constantly expose along an outside of the substantially opaque conductive layer.

In the liquid crystal display device, the pad is formed in such a manner to expose the transparent conductive layer through a contact hole.

The liquid crystal display device further comprises a storage capacitor provided by a pixel connecting line extending from the drain electrode of the thin film transistor overlaps with a portion of the common line with the insulating film therebetween.

The liquid crystal display device further comprises a storage capacitor provided such that an upper storage electrode connected to the pixel electrode overlaps with a portion of the gate line with the insulating film therebetween.

In the liquid crystal display device, the pixel connecting line is connected to the pixel electrode via a first contact hole passing through the insulating film, and the upper storage electrode is connected to the pixel electrode via a second contact hole passing through the insulating film.

The liquid crystal display device further comprises a semiconductor pattern overlapped with the drain electrode and the upper storage electrode.

In the liquid crystal display device, the semiconductor pattern not exists in the contact hole.

In the liquid crystal display device, a surface of a channel exposed between the source electrode and the drain electrode of the thin film transistor is oxidized.

In the liquid crystal display device, the data line is connected to the pad via a contact hole passing through the insulating film.

In the liquid crystal display to the pad, the thin film transistor includes a semiconductor pattern for forming a channel, the semiconductor pattern overlapped with the data line.

The liquid crystal display device according to another aspect of the present invention comprises a pair of electrodes substantially applying an electric field; wherein the electrodes have an upper part and a lower part wider than the upper part.

A method of fabricating a liquid crystal display device according to an embodiment of the present invention comprises a first mask process of forming a first conductive pattern group including a gate line and a gate electrode, a common line and a common electrode, a pixel electrode and a pad in multiple conductive layers including a transparent conductive layer on a substrate, wherein the first conductive pattern group has a step shape; a second mask process of forming an insulating film and a semiconductor layer including a plurality of contact holes on the first mask pattern group; and a third mask process of forming a second pattern group including a data line, a source electrode and a drain electrode and a pixel connecting line extended from the drain electrode on the semiconductor layer, patterning the semiconductor layer, and exposing an active layer between the source electrode and the drain electrode.

a first mask process of forming a first pattern group including a gate line and a gate electrode, a common line and a common electrode, a pixel electrode and a pad in a multiple conductive layer having a stepwise shape including a transparent conductive layer on a substrate; a second mask process of forming an insulating film and a semiconductor layer including a plurality of contact holes on the first mask pattern group; and a third mask process of forming a second pattern group including a data line, a source electrode and a drain electrode on the semiconductor layer and patterning the semiconductor layer, and exposing an active layer between the source electrode and the drain electrode.

In the method, the first pattern group has a multiple-layer structure having the transparent and opaque conductive layers.

In the method, the transparent conductive layer is formed in such a manner to substantially constantly expose along an outside of the substantially opaque conductive layer.

In the method, the first mask process includes forming the transparent conductive layer and the substantially opaque conductive layer on the substrate; forming a photo-resist pattern on the substantially opaque conductive layer; and patterning the transparent conductive layer and the substantially opaque conductive layer by the photo-resist pattern as a mask.

In the method, the first mask process further includes ashing the photo-resist pattern; and etching the opaque conductive layer exposed through the ashed photo-resist pattern.

In the method, the pad is exposed the transparent conductive layer through a contact hole.

In the method, the third mask process includes forming a conductive layer on the semiconductor layer; forming a different thickness of photo-resist pattern on the conductive layer; forming the data line, the source electrode and a drain electrode by patterning a conductive layer using the photo-resist pattern as a mask; patterning the semiconductor layer by the photo-resist pattern as a mask; and exposing an active layer of the semiconductor layer.

In the method, the third mask process further includes the step of oxidizing a surface of the exposed active layer by a plasma surface process.

In the method, the plasma surface process performs on the condition that the photo-resist pattern exists.

The method further comprises forming a storage capacitor provided by the overlapping of the pixel connecting line with a portion of the common line with the insulating film therebetween.

In the method, the third mask process further includes forming an upper storage electrode connected to the pixel electrode, and overlapped with a portion of the gate line with the insulating film therebetween along with the second pattern group.

In the method, the drain electrode and the upper storage electrode are connected to the pixel electrode via a contact hole passing through the insulating film.

In the method, the semiconductor layer is overlapped along the drain electrode and the upper storage electrode, and is formed in such a manner to not exist in the contact hole.

In the method, the data line is connected to the pad via a contact hole passing through the insulating film.

In the method, the semiconductor layer is overlapped along the data line, and is formed in such a manner to not exist in the contact hole.

In the method, the third mask process further includes exposing a transparent conductive layer of the pad through the contact hole.

In the method, the third mask process uses one of a half tone mask and a diffractive exposure mask.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5A to FIG. 5C are sectional views for specifically explaining the first mask process according to an embodiment of the present invention;

FIG. 6A and FIG. 6B are a plan view and a sectional view for explaining a second mask process in a method of fabricating the thin film transistor substrate according to an embodiment of the present invention;

FIG. 7A and FIG. 7B are a plan view and a sectional view for explaining a third mask process in a method of fabricating the thin film transistor substrate according to an embodiment of the present invention; and FIG. 8A to FIG. 8D are sectional views for specifically explaining the third mask process according to the embodiment of the present invention;

DETAILED DESCRIPTION OF THE ILLUSTRATED EMBODIMENT

Reference will now be made in detail to an embodiment of the present invention, example of which is illustrated in the accompanying drawings.

Hereinafter, the embodiments of the present invention will be described in detail with reference to FIG. 2 to FIG. 8D.

Figure 1:
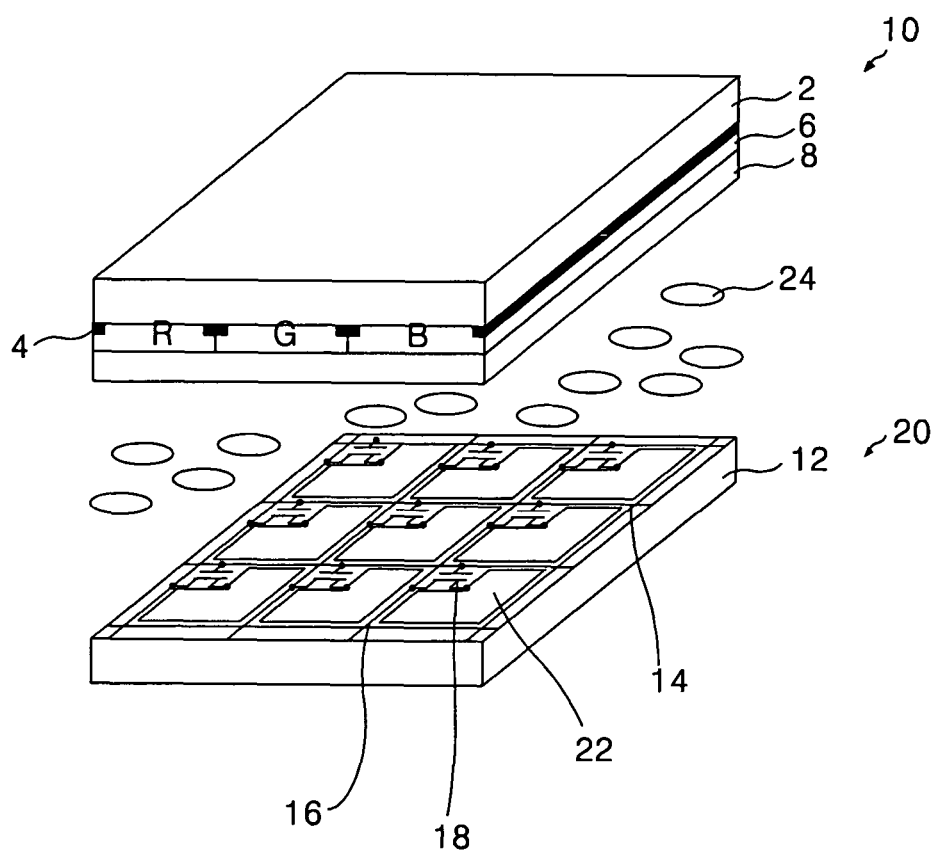
FIG. 1 is a schematic perspective view illustrating a structure of a related art liquid crystal display panel.
Figure 2:
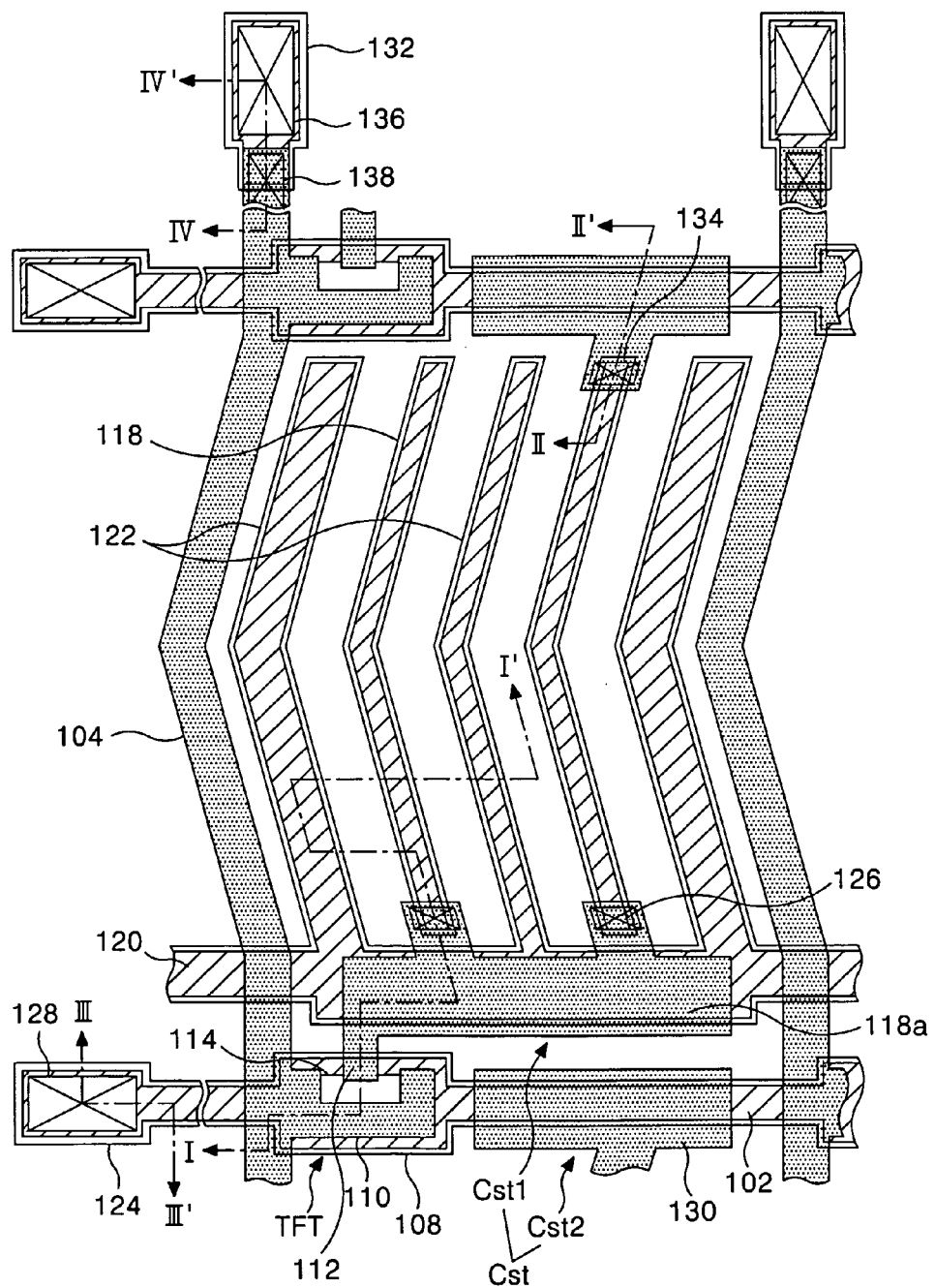
FIG. 2 is a plan view illustrating a portion of a thin film transistor substrate of a liquid crystal display device according to an embodiment of the present invention.
Figure 3:
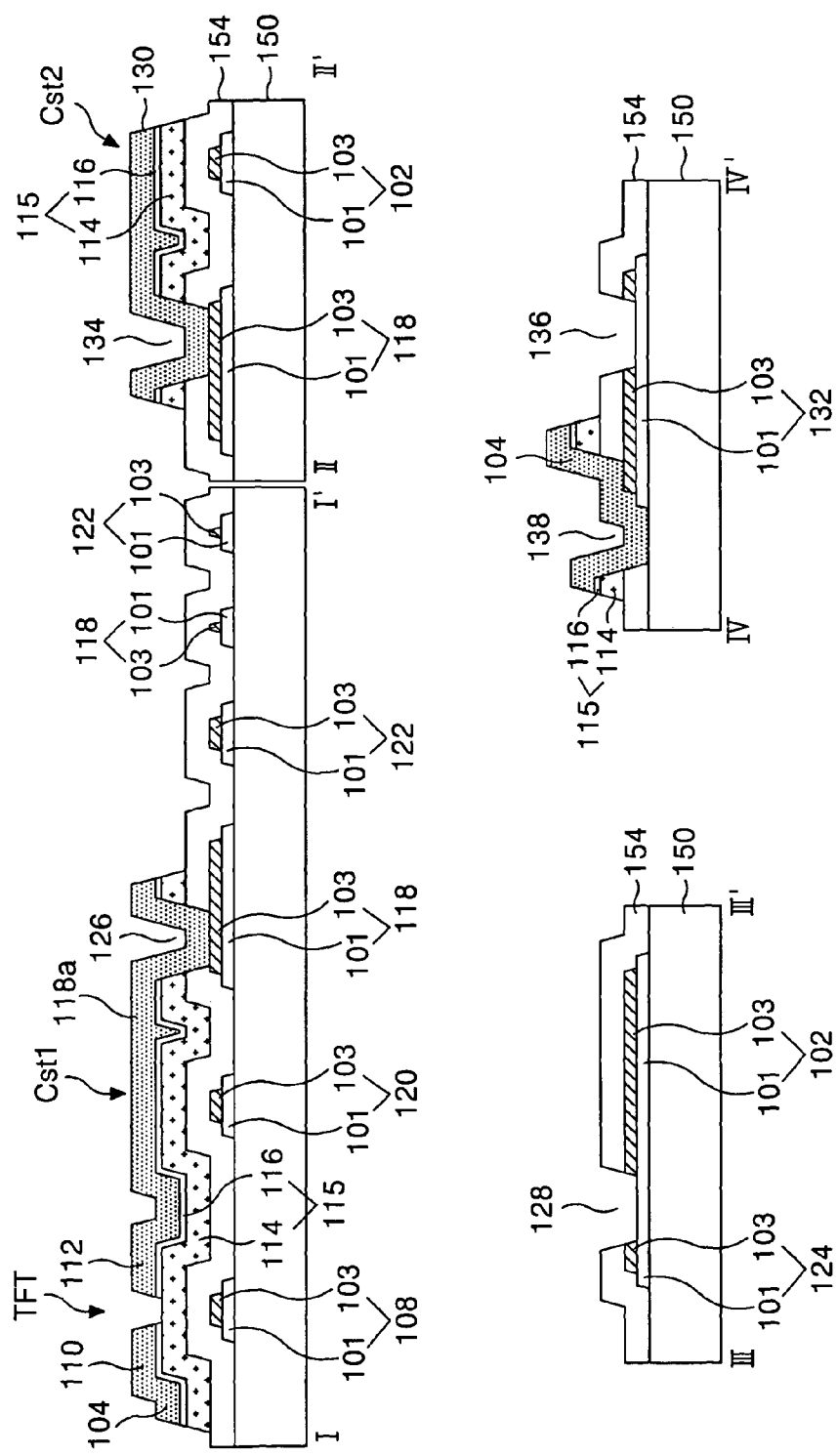
FIG. 3 is a sectional view of the thin film transistor substrate taken along the I-I', II-II', III-III', IV-IV' lines in FIG. 2.

FIG. 2 is a plan view illustrating a portion of a thin film transistor substrate of a liquid crystal display device of horizontal electric field applying type according to an embodiment of the present invention. FIG. 3 is a sectional view of the thin film transistor substrate taken along the I-I', II-II', III-III', and IV-IV' lines in FIG. 2.

Referring to FIG. 2 and FIG. 3, the thin film transistor (TFT) substrate of horizontal electric field applying type includes a gate line 102 and a data line 104 provided on a lower substrate 150 to cross each other with gate insulating film 154 therebetween and to define a pixel area. The TFT substrate further includes a thin film transistor TFT connected to the gate line 102, the data line 104 and a pixel electrode 118; the pixel electrode 118 and a common electrode 122 form a horizontal electric field at said pixel area; a common line 120 connected to the common electrode 122; and a storage capacitor Cst connected to a pixel electrode 118. Further, the thin film transistor substrate includes a gate pad 124 connected to the gate line 102, a data pad 132 connected to the data line 104, and a common pad (not shown) connected to the common line 120.

The gate line 102 supplies a scanning signal from a gate driver (not shown) while the data line 104 supplies a video signal from a data driver (not shown). The gate line 102 and the data line 104 cross each other with a gate insulating film 154 therebetween to define each pixel area.

The thin film transistor TFT allows a video signal applied to the data line 104 to be charged into a pixel electrode 118 and be held in response to a scanning signal applied to the gate line 102. To this end, the thin film transistor TFT includes a gate electrode 108 connected to the gate line 102, a source electrode 110 connected to the data line 104, a drain electrode 112 positioned in opposition to the source electrode 110 to be connected to a pixel electrode 118, an active layer 114 overlapping with the gate electrode 108 with the gate insulating film 154 therebetween to define a channel between the source electrode 110 and the drain electrode 112, and an ohmic contact layer 116 for making an ohmic contact with an active layer 114, the source electrode 110 and the drain electrode 112.

A semiconductor pattern 115 including an active layer 114 and an ohmic contact layer 116 is also overlapped with a data line 104 and an upper storage electrode 130.

The common line 120 supplies, via the common electrode 122, a reference voltage for driving the liquid crystal, that is, a common voltage to each pixel. A plurality of common electrodes 122 within the pixel area extend from the common line 120 substantially in parallel to the pixel electrodes 118. For example, as illustrated in FIG. 2, a common electrode 122 and a pixel electrode 118 may be formed in a zigzag manner along with the data line 104. Also, a common electrode 122 and a pixel electrode 118 may be formed in a linear manner or a stripe manner along with the data line 104 as well as a configurations. The common electrode 122 and the pixel electrode 118 may be formed in a zigzag manner and the data line 104 may be formed in a linear manner or a stripe manner.

A plurality of pixel electrodes 118 is formed substantially in parallel to the plurality of common electrodes 122 in the pixel area, and is connected, via a first contact hole 126, to the drain electrode 112. If a video signal is applied, via the thin film transistor, to the pixel electrode 118, then a horizontal electric field is formed between the pixel electrode 118 and the common electrode 122 supplied with the common voltage. Liquid crystal molecules arranged in the horizontal direction between the thin film transistor array substrate and the color filter array substrate are rotated in response to such horizontal electric field due to a dielectric anisotropy. The amount of transmittance of light passing through the pixel area is differentiated depending upon the extent of rotation of the liquid crystal molecules, thereby implementing a gray level scale.

A storage capacitor Cst includes a first storage capacitor Cst1 and second storage capacitor Cst2 connected in parallel with the pixel electrode 118. The first storage capacitor Cst1 is provided by a pixel connecting line 118a extending from the drain electrode 112 of the thin film transistor TFT and overlapping a portion of the common line 120 with the gate insulating film 154 and the semiconductor pattern 115 therebetween. A portion extended from the pixel connecting line 118a is overlapped with the pixel electrode 118 and is connected, via the first contact hole 126 passing through the gate insulating film 154, to the pixel electrode 118. The second storage capacitor Cst2 is provided such that a pre-stage gate line 102 is overlapped with an upper storage electrode 130 with the gate insulating film 154 and the semiconductor pattern 115 therebetween. The upper storage electrode 130 overlapped with the pre-stage gate line 102 extends to be overlapped with the pixel electrode 118 and is connected, via the second contact hole 134 passing through the gate insulating film 154, to the pixel electrode 118. Thus, a capacitance value of the storage capacitor Cst is increased by a multiple connection of such first and second storage capacitor Cst1 and Cst2, so that the storage capacitor Cst allows a video signal charged in the pixel electrode 118 to be stably maintained until a next signal is charged.

The gate line 102, the gate electrode 108, the common line 120, the common electrode 122 and the pixel electrode 118 are formed on a substrate 150 in a multiple-layer structure having at least a double conductive layer including a transparent conductive layer. For example, as illustrated in FIG. 3, the gate line 102, the gate electrode 108, the common line 120, the common electrode 122 and the pixel electrode 118 have a double-layer structure having a first conductive layer 101 employing a transparent conductive layer and a second conductive layer 103 formed of a substantially opaque metal. In this case, first and second conductive layers 101 and 103 are provided in a stepwise shape so that a surface of the first transparent conductive layer 101 is substantially exposed along an edge of the second opaque conductive layer 103. Accordingly, the first conductive layer 101 exposed from the common electrode 122 and the pixel electrode 118 increases a transmittance of a light, so that brightness can be improved. Also, the second conductive layers 103 of the common electrode 122 and the pixel electrode 118 prevent the light leakage and reduce black brightness, so that a contrast ratio can be improved.

The gate line 102 is connected, via the gate pad 124, to the gate driver (not shown). The gate pad 124 extends from the gate line 102 and has a multiple-layer structure having at least the first and second conductive layers 101 and 103. Also, the gate pad 124 has a structure in which the first transparent conductive layer 101 is exposed through a third contact hole 128 passing through the gate insulating film 154 and a second conductive layer 103.

The data line 104 is connected, via the data pad 132, to the data driver (not shown). The data pad 132 has a multiple-layer structure having at least first and second conductive layers 101 and 103 similar to the gate pad 124. Also, the data pad 132 has a structure in which the first transparent conductive layer 101 is exposed through a fourth contact hole 136 passing through the gate insulating film 154 and a second conductive layer 103. Moreover, the data pad 132 is connected, via a fifth contact hole 138 passing through the gate insulating film 154, to the data line 104.

A common pad (not shown) supplies a common voltage from a common voltage source (not shown) to the common line 120 and has the same structure as the gate pad 124.

A protective film is not formed on the thin film transistor of the present invention. But, the data line 104 is protected by an alignment film (not shown) to be formed thereon along with the thin film transistor TFT and the upper storage electrode 130. Specifically, the active layer 114 exposed between the source electrode 110 and the drain electrode 112 is protected by a surface layer oxidized into $SiO_2$ through a plasma surface process, so that a reliability of a channel can be maintained without the protective film.

As described above, the thin film transistor substrate of horizontal electric field applying type according to the embodiment of the present invention having no protective film is formed by the following three-round mask process.

Figure 4A:
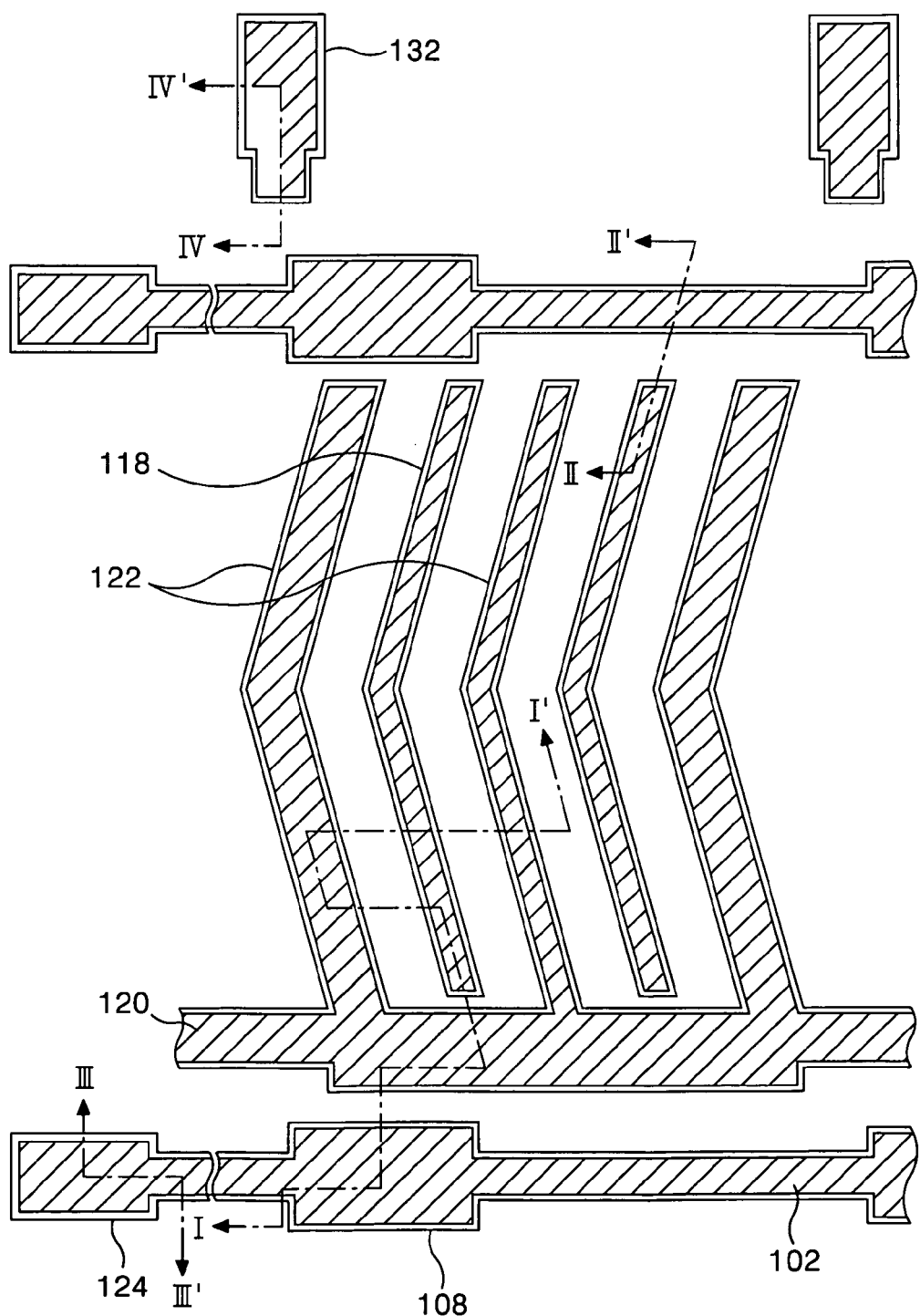
FIG. 4A and FIG. 4B are a plan view and a sectional view for explaining a first mask process in a method of fabricating the thin film transistor substrate according to an embodiment of the present invention.
Figure 4B:
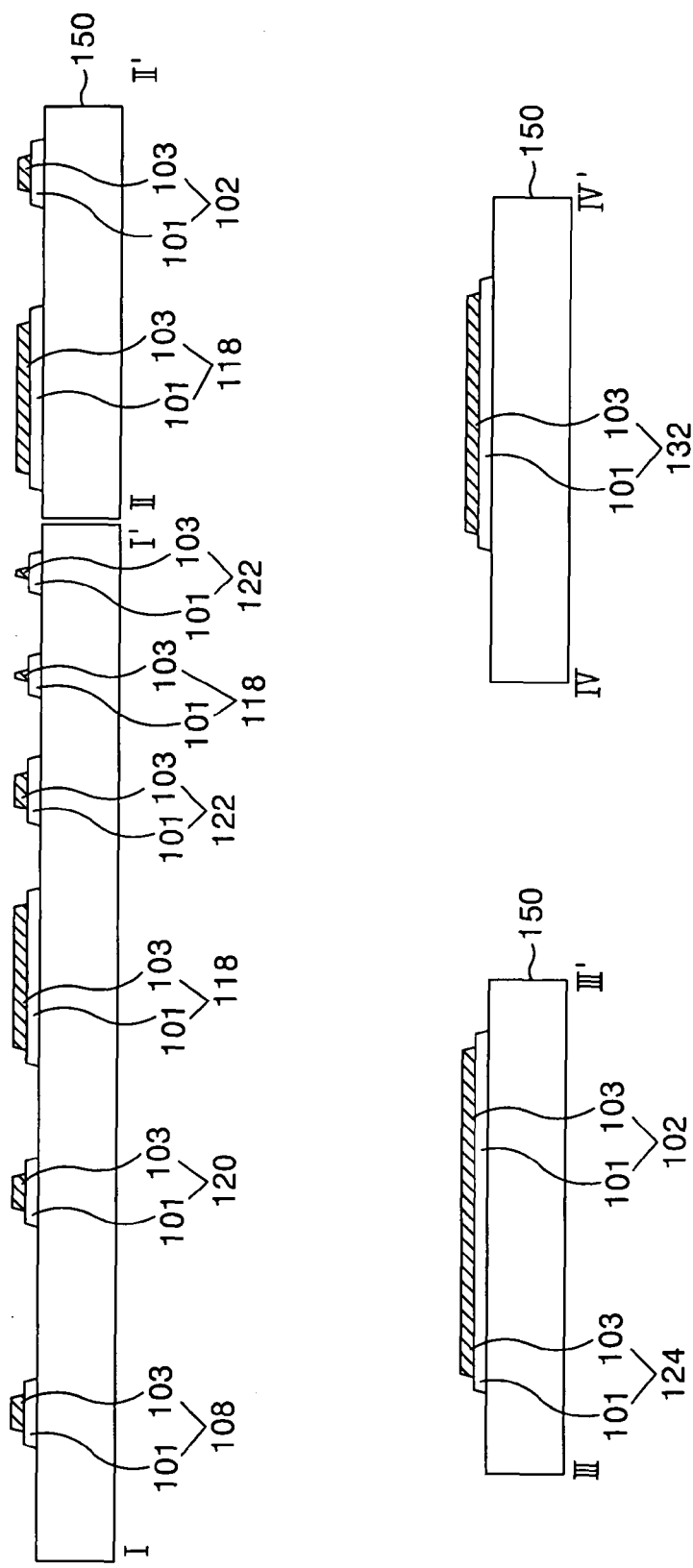
Figure 5B:
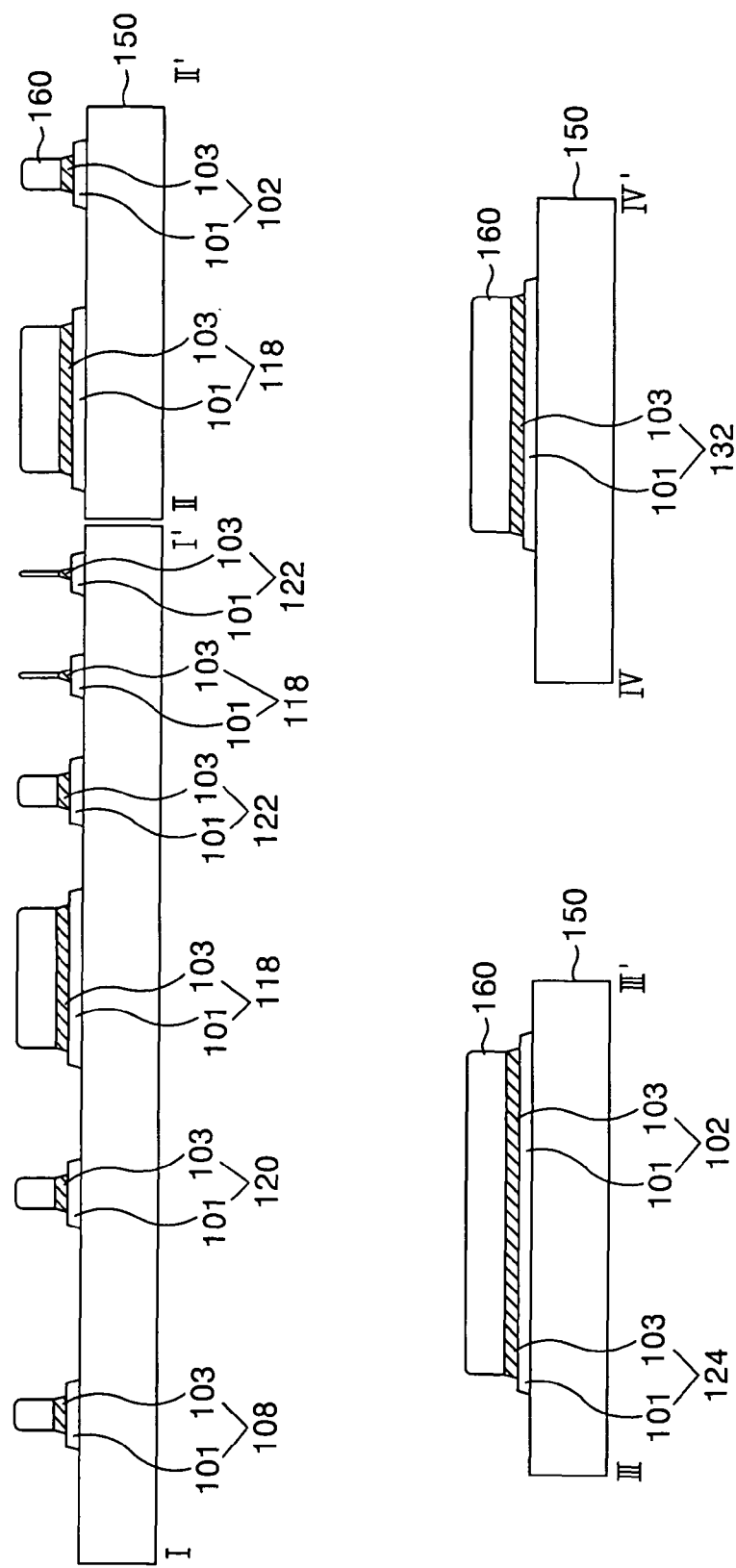
Figure 5C:
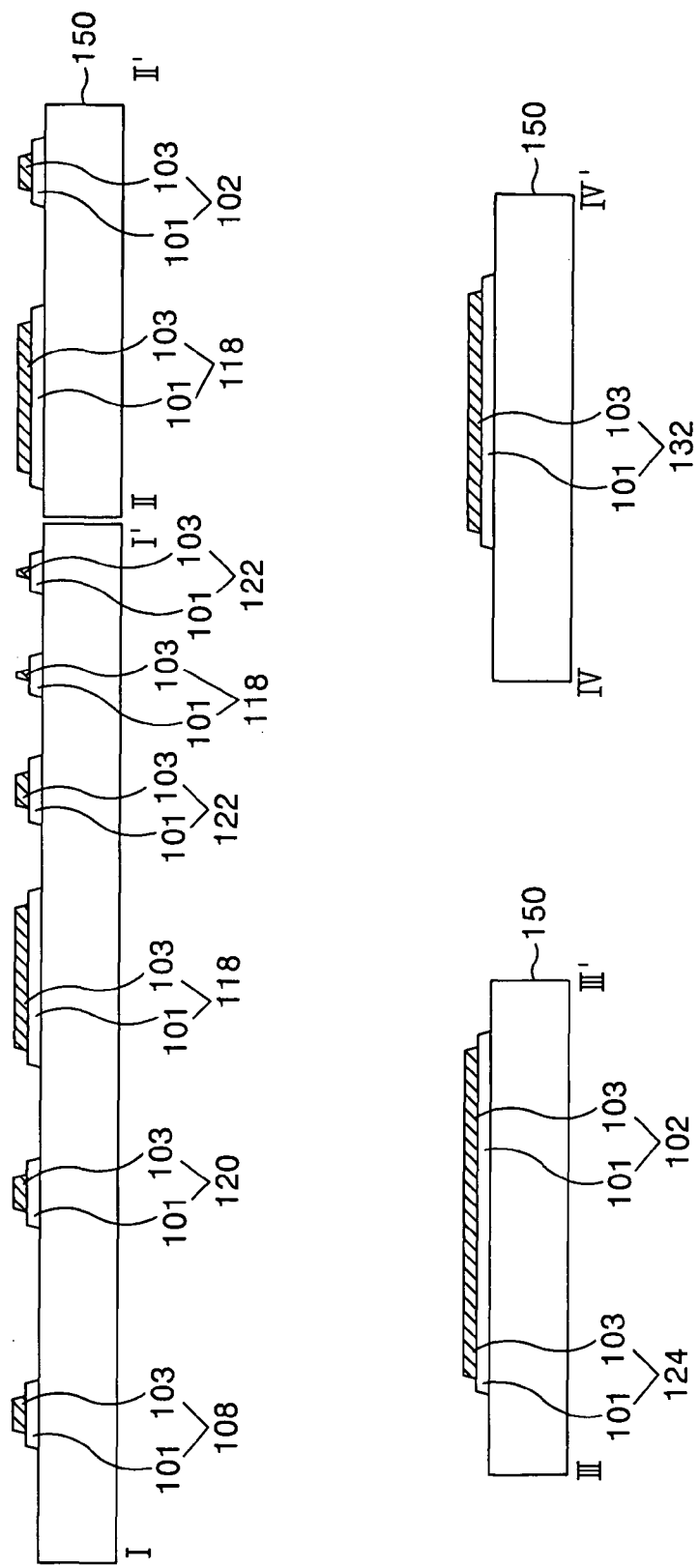

FIG. 4A and FIG. 4B are a plan view and a sectional view, respectively, for explaining a first mask process in a method of fabricating the thin film transistor substrate of horizontal electric field applying type according to the embodiment of the present invention, FIG. 5A to FIG. 5C are sectional views for specifically explaining the first mask process according to the embodiment of the present invention.

A first pattern group including the gate line 102, the gate electrode 108, the common line 120, the common electrode 122, the pixel electrode 118, the gate pad 124 and the data pad 132 is formed on the lower substrate 150 by the first mask process. The first pattern group has a multiple-layer structure having at least the first and second conductive layers 101 and 103. Herein, a surface the first transparent conductive layer 101 is substantially constantly exposed along the edge of the second opaque conductive layer 103.

Referring to FIG. 5A, the first and second conductive layers 101 and 103 are disposed on the lower substrate 150 by a deposition technique such as sputtering, etc., and a photo-resist pattern 160 is formed on the second conductive layer 103 by a photolithography process. The first and second conductive layers 101 and 103 are patterned by an etching process using the photo-resist pattern 160 as a mask, thereby providing the first pattern group including a multiple-layer structure of the gate line 102, the gate electrode 108, the common line 120, the common electrode 122, the pixel electrode 118, the gate pad 124 and the data pad 132. The first conductive layer 101 is formed of a transparent conductive material such as ITO, TO, IZO or ITZO, etc. On the other hand, the second conductive layer 103 employs a single layer formed of a metal material or double layer of materials such as Mo, Ti, Cu, AlNd, Al, Cr, a Mo-alloy, a Cu-alloy or an Al-alloy, etc.

Referring to FIG. 5B, the photo-resist pattern 160 is ashed by an ashing process, thereby allowing a thickness and width of the photo-resist pattern 160 to be reduced. And, the second conductive layer 103 exposed by the ashed photo-resist pattern 160 as a mask is again etched, thereby allowing the first and second conductive layers 101 and 103 to have constant step coverage, so that the first conductive layer 101 is exposed along the edge of the second conductive layer 103. The second conductive layer 103 is formed at the interior surface of the first conductive layer 101 by adjusting the ashing process, so that it becomes possible to improve the contrast ratio without a reduction of brightness. In other words, the first conductive layer 101 can improve brightness while the second conductive layer 103 can reduce black brightness. The ashing process may not be applied or ashing process may be omitted.

Referring to FIG. 5C, the photo-resist pattern 160 left on the second conducive layer 103 of the first mask pattern group in FIG. 5B is removed by the stripping process.

Figure 6A:
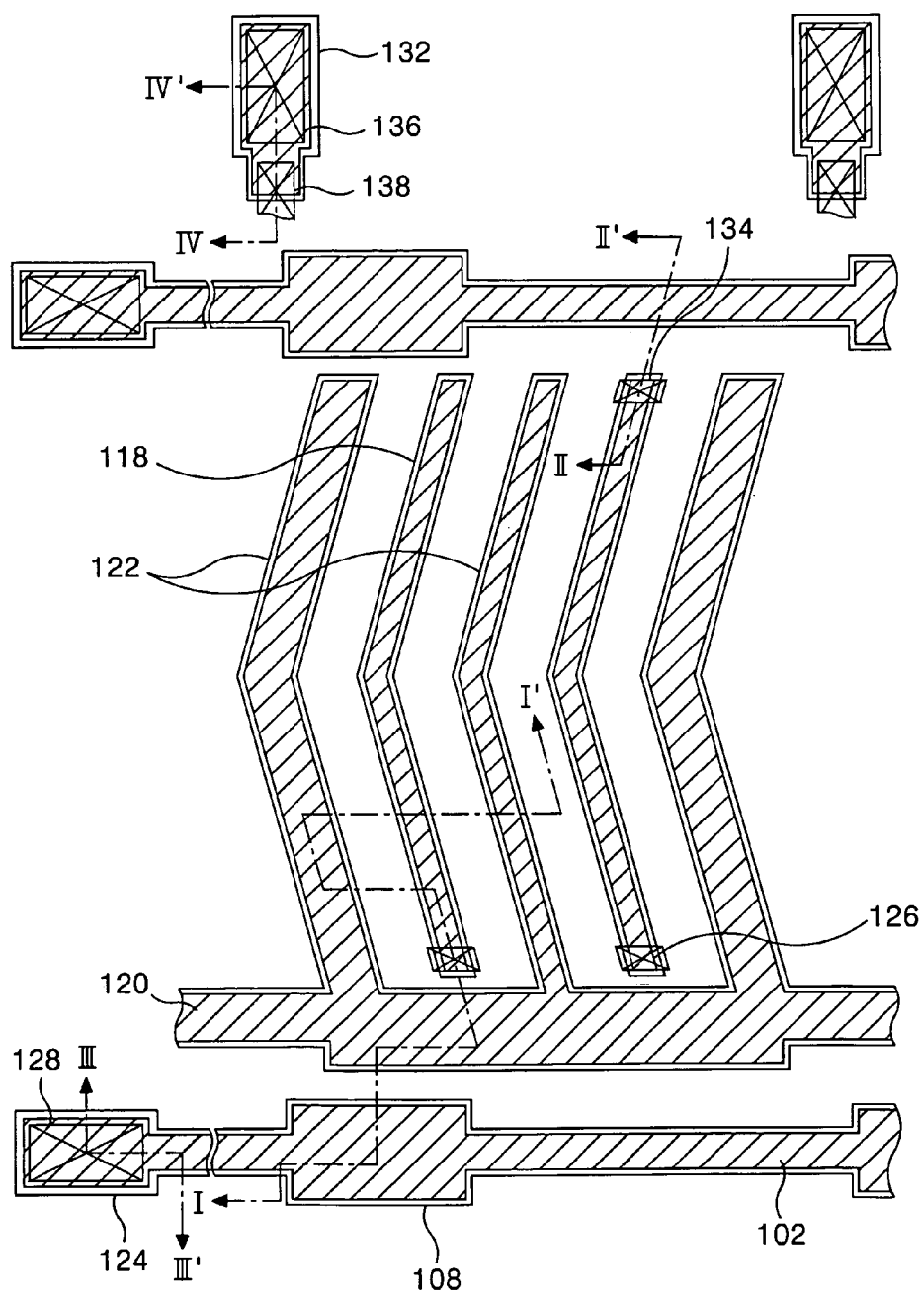

FIG. 6A and FIG. 6B are a plan view and a sectional view for explaining a second mask process in a method of fabricating the thin film transistor substrate according to the embodiment of the present invention.

The gate insulating film 154 including a plurality of contact holes 126, 134, 128, 136 and 138, and the semiconductor layers 105, 107 are formed on a lower substrate 150 provided with the first pattern group by the second mask process.

Specifically, the gate insulating film 154, an amorphous silicon layer 105 and an amorphous silicon layer 107 doped with an $n^+$ or $p^+$ impurity are sequentially disposed on the lower substrate 150 provided with the first mask pattern group by a deposition technique such as PECVD, etc. Herein, the gate insulating film 154 is formed of an inorganic insulating material such as silicon oxide ($SiO_x$) or silicon nitride ($SiN_x$). Next, the first to fifth contact holes 126, 134, 128, 136 and 138 passing through the gate insulating film 154 are formed by the photolithography process and the etching process. The first and second contact holes 126 and 134 expose the pixel electrode 118, the third contact hole 128 exposes the gate pad 124 and the fourth and fifth contact holes 136 and 138 expose the data pad 132.

Figure 7A:
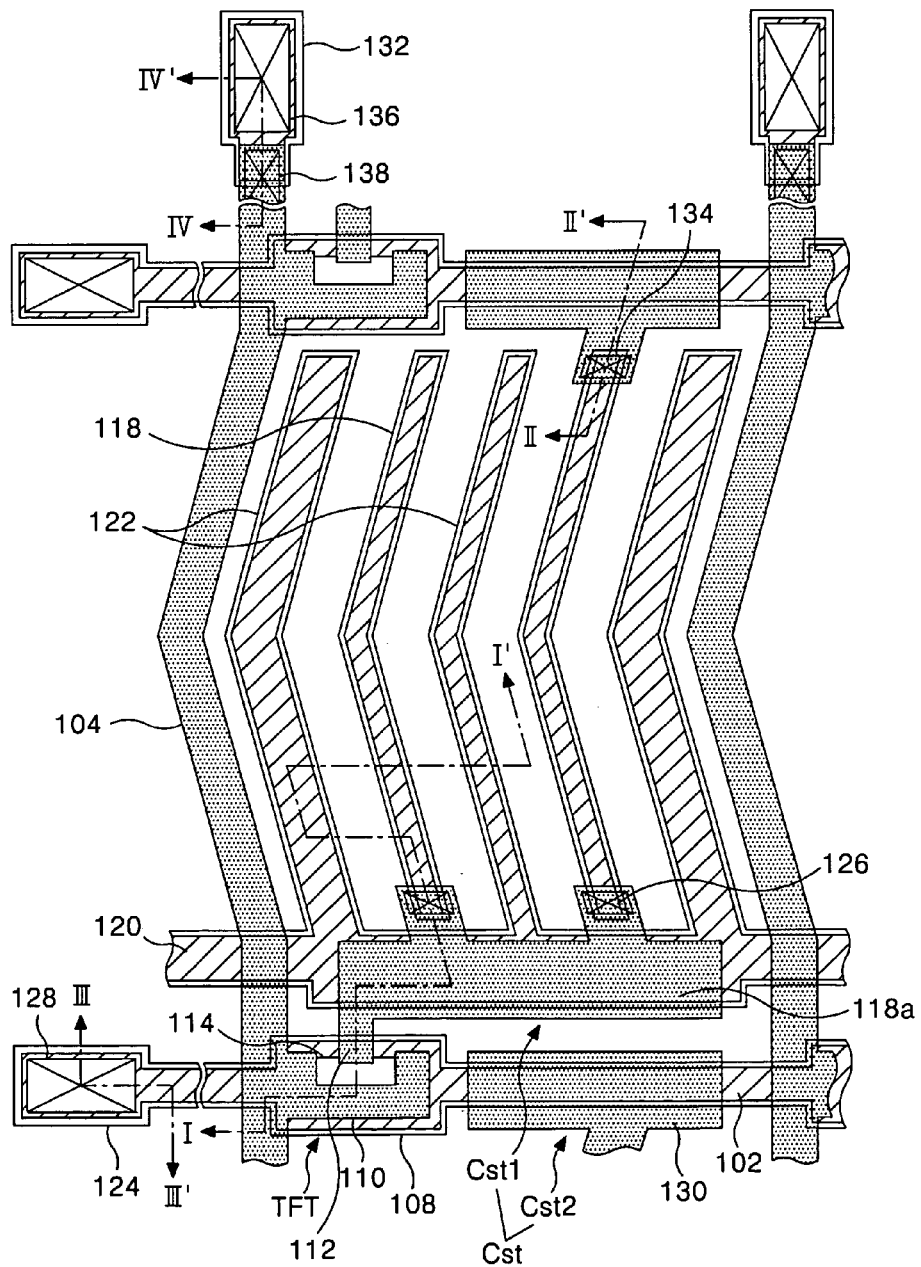

FIG. 7A and FIG. 7B are a plan view and a sectional view, respectively, for explaining a third mask process, in a method of fabricating the thin film transistor substrate according to the embodiment of the present invention, FIG. 8A to FIG. 8D are sectional views for specifically explaining the third mask process according to the embodiment of the present invention.

The second pattern group including the data line 104, the source electrode 110, the drain electrode 112, the pixel connecting line 118*a* and the upper storage electrode 130 are formed on the doped amorphous silicon layer 107, and the second conductive layers 103 of the gate pad 124 and the data pad 132 are exposed through third and fourth contact holes 128 and 136. Also, the semiconductor pattern 115 overlapping the second pattern group is formed, and an oxidized surface between the active layer 114, the source electrode 110 and the drain electrode 112 is exposed Referring to FIG. 8A, a third conductive layer 109 is formed on the doped amorphous silicon layer 107 by a deposition technique such as the sputtering, etc., and a different thickness of photo-resist pattern 170 is formed on the third conductive layer 109 by the photolithography process using a half tone mask and a diffractive exposure mask. The photo-resist pattern 170 includes a different thickness as of first and second photo-resist patterns 170A and 170B. The third conductive layer 109 employs a single layer formed of a metal material or has a layer structure of at least double layers such as Mo, Ti, Cu, AlNd, Al, Cr, a Mo-alloy, a Cu-alloy or an Al-alloy, etc.

Referring to FIG. 8B, the third conductive layer 109 is patterned by the etching process using the photo-resist pattern 170 as a mask to thereby provide the second pattern group including the drain electrode 112, the pixel connecting line 118*a*, the upper storage electrode 130, and the source electrode 110 being integral to the data line 104. In this case, the second conductive layers 103 of the gate pad 124 and the data pad 132 exposed through the third and fourth contact holes 128 and 136 are also etched, to thereby expose a first transparent conductive layer 101. And, the doped amorphous silicon layer 107 and the amorphous silicon layer 105 are patterned along the second pattern group to thereby provide the semiconductor pattern 115 including the ohmic contact hole 116 overlapping the second pattern group and the active layer 114. Such a semiconductor pattern 115 is overlapped along the second pattern group. But, the semiconductor pattern 115 does not exist in the first, second and fifth contact holes 126, 134 and 138 formed in such a manner to pass through the gate insulating film 154 in the above-mentioned second mask process. Accordingly, the pixel connecting line 118*a* and the upper storage electrode 130 are connected, via each first and second contact holes 126 and 134, to the pixel electrode 118, and the data line 104 is connected, via the fifth contact hole 138, to the data pad 132.

Figure 8A:
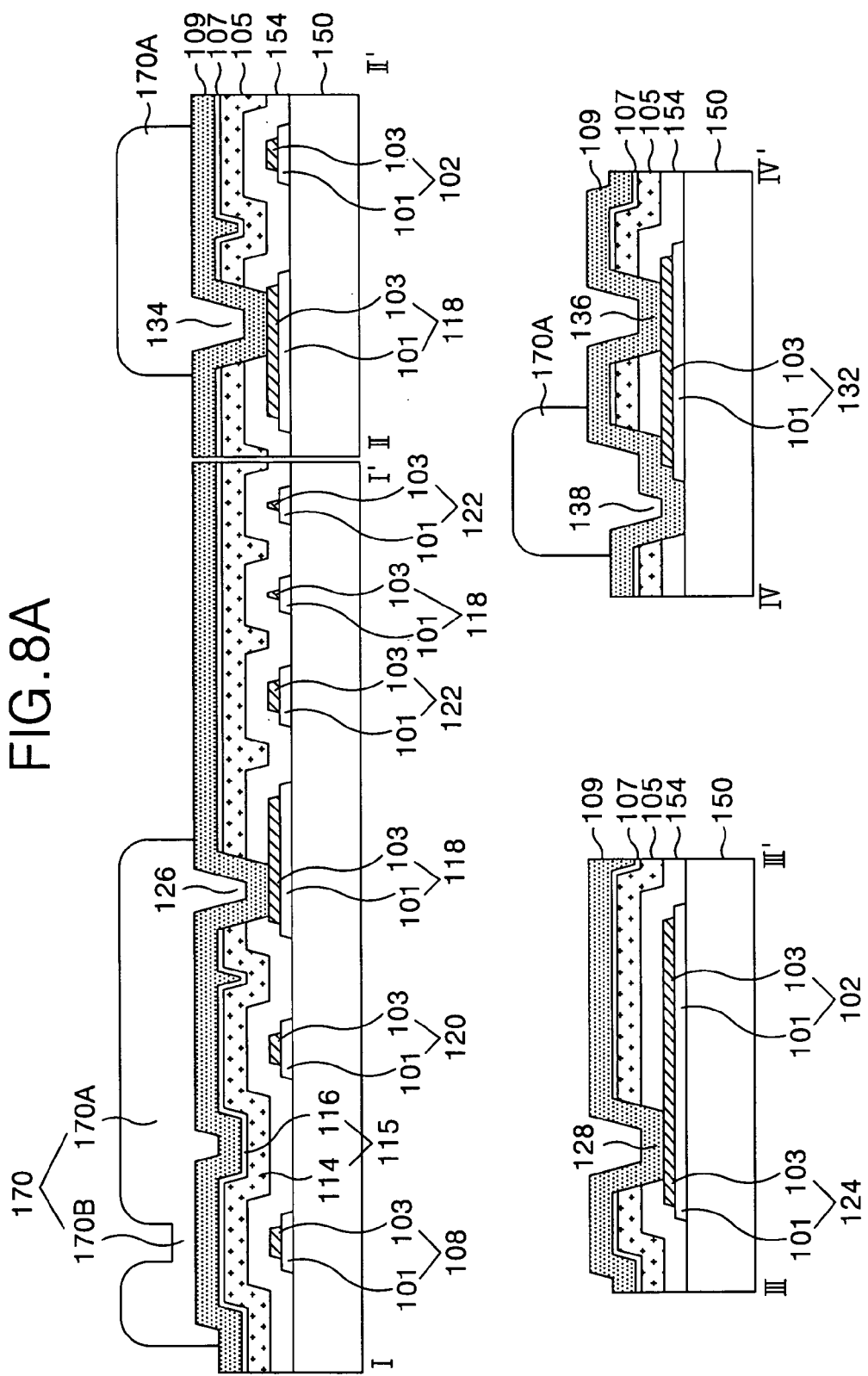
Figure 8C:
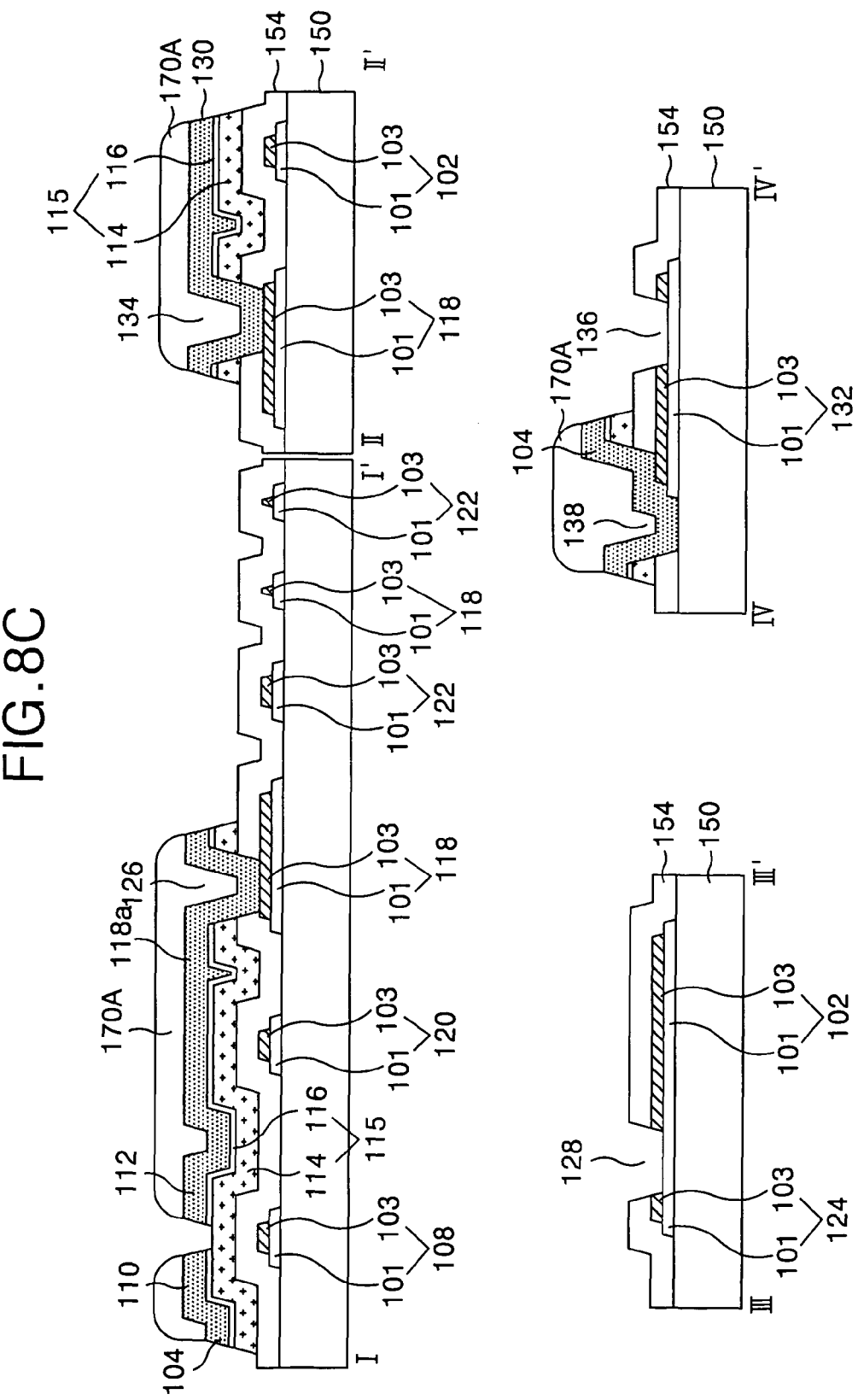

Referring to FIG. 8C, a thickness of the first photo-resist pattern 170A is thinned while the second photo-resist pattern 170B is removed by the ashing process. Next, the source electrode 110 and the drain electrode 112 are separated, and the ohmic contact layer 116 under it is removed by the etching process using the first photo-resist pattern 170A as a mask, to thereby expose the active layer 114. A surface of the exposed active layer 114 is oxidized into $SiO_2$ by a surface process using an oxygen ($O_2$) plasma, so that the reliability of the channel can be maintained without the protective film.

Referring to FIG. 8D, the first photo-resist pattern 170A left on the third mask pattern group in FIG. 8C is removed by the stripping process.

Accordingly, the method of fabricating the thin film transistor substrate of horizontal electric field applying type according to the embodiment of the present invention can be simplified by the three-round mask process.

As described above, in the thin film transistor substrate of a liquid crystal display of horizontal electric field applying type and a fabricating method thereof according to the present invention, a first mask pattern having a multiple conductive layer structure having a step shape is formed by the first mask process. Accordingly, the transparent conductive layer exposed from the common and pixel electrodes can contribute to brightness, and a substantially opaque conductive layer of the upper substrate prevents the light leakage and reduces black brightness, to thereby contribute to the contrast ratio.

Also, in the thin film transistor substrate of horizontal electric field applying type and the fabricating method thereof according to the present invention, a plurality of contact holes passing through the semiconductor layer and the gate insulating film are formed by the second mask process.

Furthermore, in the thin film transistor substrate of horizontal electric field applying type and the fabricating method thereof according to the present invention, the third mask pattern group and the semiconductor pattern are formed, and then the active layer of the semiconductor pattern is exposed and the surface thereof is oxidized by the third mask process. Accordingly, the reliability of the channel is secured, and the third mask pattern group is protected by the alignment film to be formed thereon, so that a protective film is not required.

Accordingly, the entire process can be simplified by the three-round mask process, so that it becomes possible to reduce the material cost and the equipment investment cost, etc. as well as to improve the productivity.

The above described liquid crystal display device and method of fabricating is applicable to not only a horizontal electric applying type, but to other embodiments, for example, fringe field switching (FFS), and to plasma display panel (PDP).

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:
    a first mask process of forming a first conductive pattern group including a pre-stage gate line, a gate line and a gate electrode, a common line and a common electrode, a pixel electrode, a gate pad, a data pad and a common pad, each including a transparent conductive layer on a substrate and an opaque conductive layer thereon;
    a second mask process of forming an insulating film and a semiconductor layer including a plurality of contact holes on the first conductive pattern group;
    a third mask process of forming a second pattern group including a data line, a source electrode and a drain electrode, a pixel connecting line and an upper storage electrode, and patterning an ohmic contact layer of the semiconductor layer to expose an active layer between the source electrode and the drain electrode, wherein the pixel connecting line is separate and physically disconnected from the upper storage electrode,
    wherein the forming the first conductive pattern group includes the step of etching an edge portion of the opaque conductive layer such that the etched opaque conductive layer has a smaller width than that of the transparent conductive layer in the pixel electrode and the common electrode; and
    forming a first capacitor provided by an overlapping of the pixel connecting line with a portion of the common line with the insulating film therebetween,
    wherein the pixel electrode is connected to the pixel connecting line and the upper storage electrode via first and second contact holes, respectively.

2. The method of claim 1, wherein the data pad exposes the transparent conductive layer via a third contact hole.

3. The method of claim 1, wherein the third mask process includes:
   forming a conductive layer on the semiconductor layer;
   forming a photo-resist pattern having a different thickness on the conductive layer;
   forming the data line, the source electrode, the drain electrode and the pixel connecting line by patterning the conductive layer using the photo-resist pattern as a mask;
   patterning the semiconductor layer using the photo-resist pattern as a mask; and
   exposing the active layer of the semiconductor layer.

4. The method of claim 3, wherein the third mask process further includes:
   oxidizing a surface of the exposed active layer using a plasma surface process.

5. The method of claim 4, wherein the plasma surface process is performed on the condition that the photo-resist pattern exists.

6. The method of claim 1, wherein the third mask process further includes:
   forming the upper storage electrode connected to the pixel electrode, and overlapped with a portion of the gate line with the insulating film therebetween along with the second pattern group.

7. The method of claim 6, wherein the pixel connecting line is connected to the pixel electrode via the first contact hole passing through the insulating film, and the upper storage electrode is connected to the pixel electrode via the second contact hole passing through the insulating film.

8. The method of claim 7, wherein the semiconductor layer is overlapped along the pixel connecting line and the upper storage electrode, and is formed in such a manner to not exist in the first and second contact holes.

9. The method of claim 1, wherein the third mask process further includes:
   forming the upper storage electrode connected to the pixel electrode, and overlapped with a portion of the gate line with the insulating film therebetween.

10. The method of claim 9, wherein the upper storage electrode is connected to the pixel electrode via the second contact hole passing through the insulating film.

11. The method of claim 10, wherein the semiconductor layer is overlapped along the upper storage electrode, and is formed in such a manner to not exist in the second contact hole.

12. The method of claim 1, wherein the data line is connected to the data pad via a third contact hole passing through the insulating film.

13. The method of claim 12, wherein the semiconductor layer is overlapped along the data line, and is formed in such a manner to not exist in the third contact hole.

14. The method of claim 1, wherein the third mask process further includes exposing the transparent conductive layer of the data pad through the third contact hole.

15. The method of claim 1, wherein the third mask process uses one of a half tone mask and a diffractive exposure mask.

16. The method of claim 1, wherein the first mask process includes:
   forming the transparent conductive layer and the opaque conductive layer on the substrate;
   forming a photo-resist pattern on the opaque conductive layer;
   patterning the transparent conductive layer and the opaque conductive layer using the photo-resist pattern as a mask;
   ashing the photo-resist pattern to reduce a thickness and width of the photo-resist pattern; and
   etching the edge portion of the opaque conductive layer exposed through the reduced photo-resist pattern to expose an edge portion of the transparent conductive layer corresponding to the edge portion of the opaque conductive layer.

17. The method of claim 1, wherein the third mask process includes:
   forming a conductive layer on the semiconductor layer;
   forming first and second photo-resist patterns having different thicknesses on the conductive layer;
   patterning the conductive layer using the first and second photo-resist patterns as a mask to form the data line, the pixel connecting line and the upper storage electrode;
   patterning the semiconductor layer using the first and second photo-resist patterns as a mask;
   ashing the first and second photo-resist patterns to remove the second photo-resist pattern and remain the first photo-resist pattern; and
   patterning the conductive layer and the ohmic contact layer of the semiconductor layer using the first photo-resist pattern as a mask to form a source electrode and a drain electrode and expose the active layer of the semiconductor layer; and
   oxidizing a surface of the exposed active layer using a plasma surface process.

18. The method of claim 1, wherein the pixel connecting line is spaced apart from with the upper storage electrode.

19. The method of claim 1, wherein the pixel connecting line overlaps with the common line and the upper storage electrode overlaps with the pre-stage gate line.

20. The method of claim 1, wherein the data line is connected to the data pad via a third contact hole passing through the insulating film.

21. The method of claim 1, wherein a substantial surface of the pixel connecting line overlaps with the common line along a lengthwise direction of the common line parallel to the gate line.

22. The method of claim 1, wherein the transparent conductive layer of at least one of the pixel electrode and the common electrode has a portion of a top surface being exposed.

* * * * *